March 8, 1927.

W. E. BROWN

DISTILLING APPARATUS

Filed Aug. 6, 1924 — 3 Sheets-Sheet 1

1,620,593

INVENTOR
WALTER E. BROWN
BY Bakewell & Church
ATTORNEYS

March 8, 1927.  
W. E. BROWN  
DISTILLING APPARATUS  
Filed Aug. 6, 1924  
1,620,593  
3 Sheets-Sheet 2

INVENTOR  
WALTER E. BROWN.  
BY Bakewell & Church  
ATTORNEYS

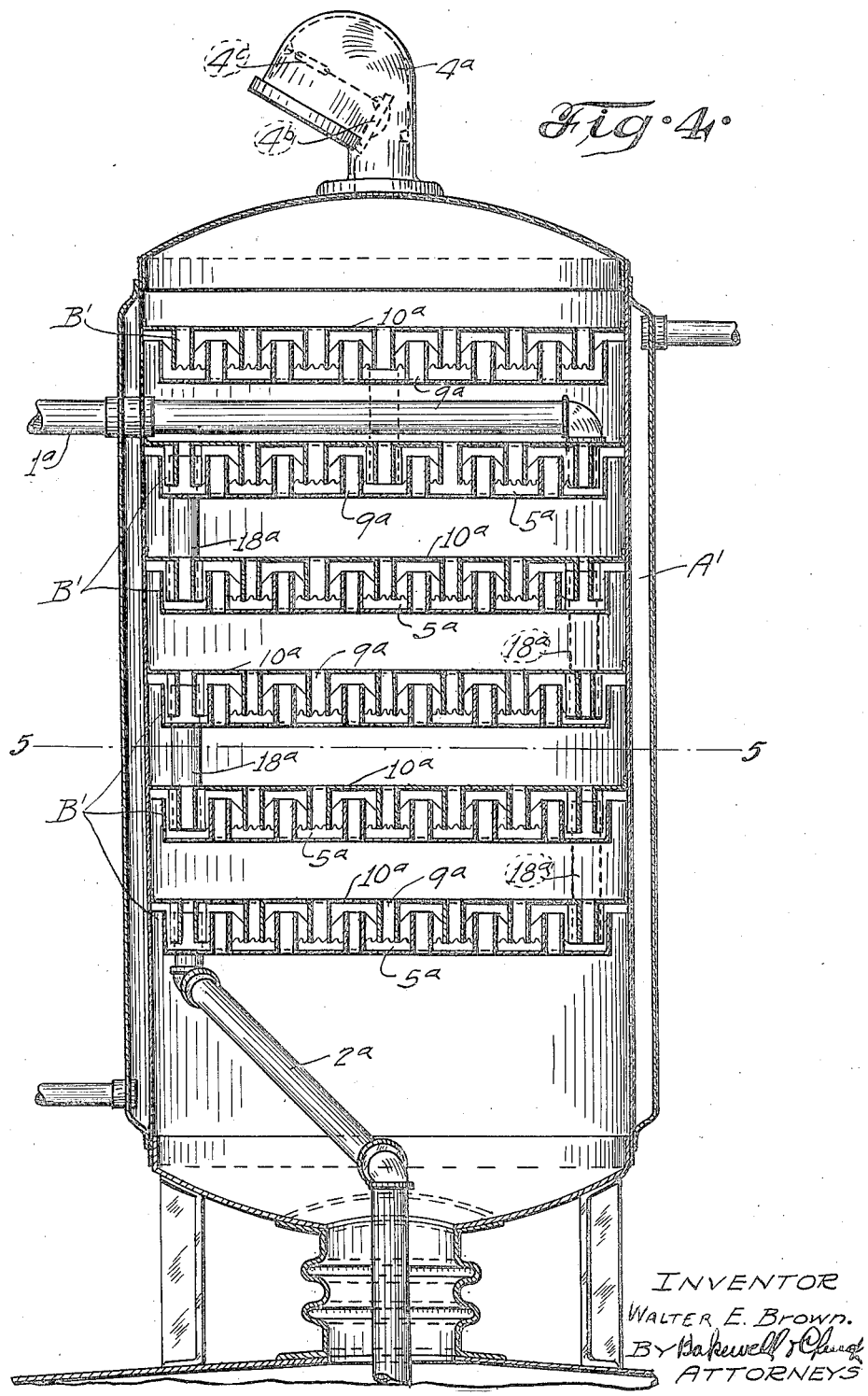

Patented Mar. 8, 1927.

1,620,593

UNITED STATES PATENT OFFICE.

WALTER E. BROWN, OF KANSAS CITY, MISSOURI, ASSIGNOR TO UNITED IRON WORKS, INC., OF KANSAS CITY, MISSOURI, A CORPORATION OF MISSOURI.

DISTILLING APPARATUS.

Application filed August 6, 1924. Serial No. 730,525.

This invention relates to apparatus of the kind in which a gas or vapor is caused to bubble through a liquid, such as fractional distilling columns and apparatus used for effecting the recovery of particles of liquid entrained in a gas or vapor.

The main object of my invention is to provide an apparatus of the general type mentioned, which is of such design that the liquid flows in a tortuous path of relatively great length, in traveling through the apparatus, and the gas or vapor is caused to bubble through the liquid numerous times, in traveling from the gas inlet to the gas outlet of the apparatus, thereby producing a compact apparatus that is highly efficient, even when built in small sizes.

Another object is to provide an apparatus of the general type mentioned, that is inexpensive to build and easy to assemble and disassemble.

I have herein illustrated my invention embodied in an apparatus that is used for accomplishing fractional distillation of vapors by the exchange of heat from a rising column of vapors to a counter current of liquid to be distilled through which the vapors are forced to pass in their upward travel, thus causing condensation of the high boiling point fractions in the vapor and causing vaporization of the low boiling point fractions in the liquid. The apparatus is not limited to this particular use, however, as it is well adapted for use in the absorption of mechanically entrained liquid particles in gases, in which instance the gases pass through the absorbing liquid, thus leaving in the liquid any liquid particles entrained in the gases.

Figure 1 of the drawings is a view partly in section and partly in side elevation of an apparatus constructed in accordance with my invention.

Figure 4 is a vertical sectional view, illustrating a slight modification of my invention.

Figure 1:
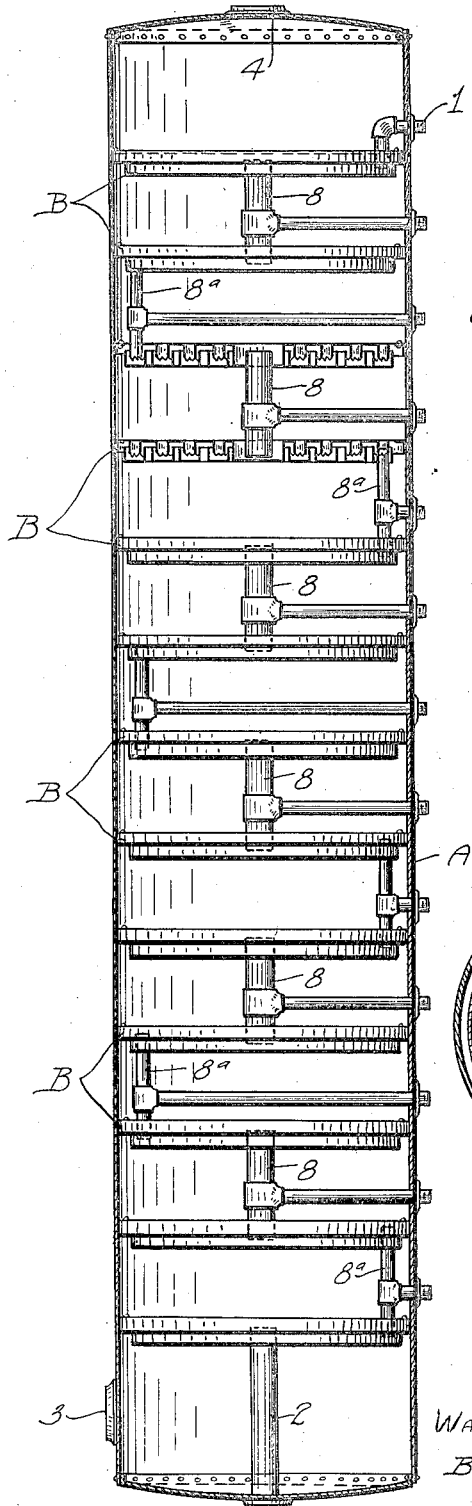
Figure 2:
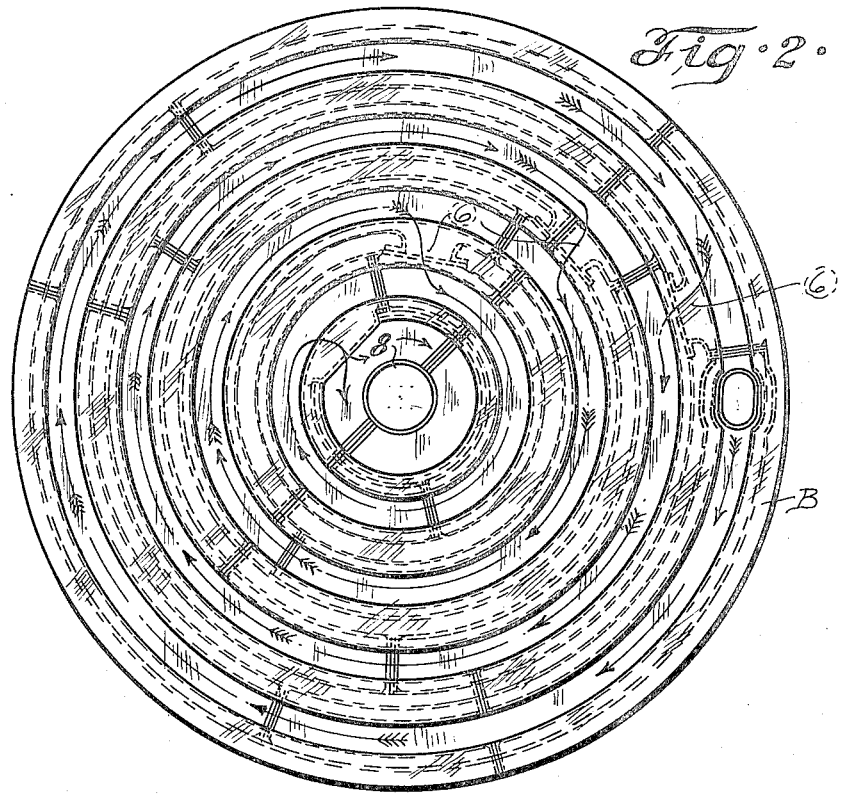
Figure 2 is an enlarged top plan view of one of the baffle structures.
Figure 3:
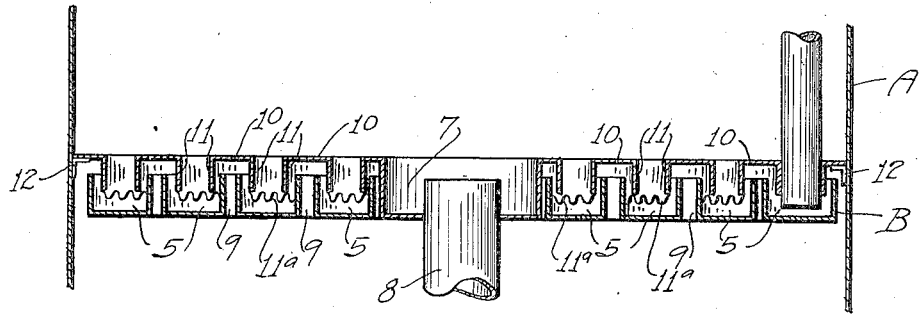
Figure 3 is an enlarged vertical transverse sectional view of said baffle structures.

Referring to Figures 1 to 3 of the drawings which illustrate one form of my invention, A designates a casing that acts as a conduit or passageway for gases or vapors which flow through said passageway in one direction, and B designates a plurality of baffle structures in said casing that are adapted to hold a liquid and which are constructed in such a way that the gases or vapors in said casing will be caused to bubble through the liquid in said baffle structures numerous times, in traveling from the point at which said gases are admitted to the point at which said gases are discharged from the casing. In the apparatus herein illustrated the casing A is disposed vertically and is of cylindrical form and the baffle structures B in said casing are arranged in superimposed relation and are so constructed that liquid which is admitted to the upper end of the casing A through a supply pipe 1 will flow downwardly through said baffle structures, and finally escape through a liquid discharge pipe 2 at the lower end of the casing. The gases or vapors are admitted at the lower end of the casing A through an inlet 3, and after flowing upwardly through the casing, escape through an outlet 4 at the upper end of the casing. Each of the baffle structures B consists of a liquid holder constructed so that liquid will circulate through same in a tortuous path, and a baffling means arranged in proximity to openings or spaces in said liquid holder up through which the gases pass and constructed in such a way as to cause the gases to bubble through the liquid in the liquid holder, in traveling past each baffle structure. Each of said liquid holders is preferably constructed in the form of an open trough composed of numerous convolutions that are spaced apart so as to form gas passageways up through which the gases circulate, said convolutions being connected together in such a manner that the liquid which is admitted to one end of the trough will circulate through same in a spiral path and then escape from the opposite end of the trough into the trough of the next lower baffle structure. The baffling means that co-operates with each liquid holder preferably consists of a number of baffling elements arranged above the gas spaces or passageways between the convolutions of the holder up through which the gases pass, and depending skirt portions on said baffling elements that project downwardly into the trough or trough portions of the liquid holder, and thus cause the gases that flow upwardly through the gas spaces or passageways in the liquid holder to bubble through the liquid contained in the holder. While I prefer to provide each liquid holder with an open trough which is of such shape or design that the liquid will flow in a substantially spiral path, in traveling through the holder, I do not wish it to be understood that my invention is limited to an apparatus in which the baffle structures in the casing A are provided with spiral troughs, for it is obvious that the same effect might be accomplished with liquid holders of various other forms, so long as the liquid holders are of such design as to provide a relatively long, tortuous passageway through which the liquid circulates, and gas spaces up through which the gases can pass and then be acted upon by a baffling means that deflects the gases downwardly into the liquid contained in or flowing through the holder.

In order to produce a compact apparatus that is highly efficient and easy to assemble, I construct each baffle structure from a number of annular liquid troughs 5 of substantially channel shape in cross section, arranged in concentric relation and connected together in such a manner that liquid will circulate through same in a spiral path, as indicated by the arrows in Figure 2. Thus, liquid admitted to one of said troughs, for example, the outer trough, will flow circumferentially around the same, then escape through a discharge opening 6, as shown in Figure 2, into the adjacent trough, and after flowing circumferentially of said adjacent trough, will escape through a discharge opening 6 in same into the next trough, etc. until it finally reaches a chamber 7 at the center of the structure, from which it escapes through an overflow pipe 8. Instead of forming the troughs 5 from separate annular members, it is obvious that a continuous spiral trough would produce the same result. The troughs 5 are spaced away from each other, as shown in Figure 3, so as to provide gas passageways or openings 9 up through which the vapors or gases can pass, in traveling upwardly through the casing A. Baffle elements 10 of substantially annular form in general outline are arranged over the passageways or openings 9 between the liquid troughs 5, and said baffle elements are provided with depending skirt portions 11 that project downwardly into the liquid troughs 5. When the appartus is in operation the gases or vapors, after flowing upwardly through the gas openings 9 of a baffle structure, are intercepted by the baffle elements 10 arranged over said openings and forced downwardly through the liquid in the troughs 5, finally escaping by bubbling through the liquid and flowing upwardly through the annular spaces between the baffle elements 10. If desired, the lower edges of the depending skirt portions 11 of the baffle elements 10 can be serrated at 11ª, as shown in Figure 3, so as to cause the gases to agitate the liquid, in bubbling through same, and thus prevent sediment or other foreign matter in the liquid from collecting in the liquid troughs. I have herein illustrated the baffle elements as being of substantially inverted channel shape in cross section, but is is not essential that the baffle elements be of this particular form, so long as they are of such design that they will intercept the gases flowing upwardly through the gas spaces or openings of the liquid holders and cause the gases to bubble through the liquid in said holders, in traveling past each baffle structure of the apparatus. For convenience in manufacture and installation, the liquid holder and the baffling means of each baffle structure are composed of a number of separate segmental castings connected together in such a way as to form a structure that can be mounted upon supports 12 on the inner surface of the side wall of the casing A, but this also is an unimportant detail, as a perfectly satisfactory baffle structure can be formed from sheet metal and the baffling means of each baffle structure combined with the liquid holder in such a way as to form practically an integral part of same.

In order to insure practically a continuous flow of the liquid through the casing A, in a counter direction to the flow of the gases or vapors through said casing, I connect the baffle structures B together in the manner shown in Figure 1, so as to cause the liquid which is supplied to the top baffle structure to flow from the outer edge towards the center of said structure, then escape from same through an overflow pipe 8 to the second baffle structure B, flow outwardly through said second baffle structure from the center towards the outer edge of same and then escape through an overflow pipe 8ª to the outer edge portion of the third baffle structure B, finally escaping from the center of same through an overflow pipe 8 to the fourth baffle structure, etc., through the successive baffle structures. In order to insure the lower edges of the depending skirt portions 11 of the baffle elements 10 being submerged in the liquid in the troughs 5, the overflow pipes 8 and 8ª that co-operate with the liquid holders are so constructed and arranged as to maintain the liquid in each liquid holder at a level above the bottom edges of the skirt portions of the baffle elements.

In view of the fact that the efficiency of apparatus of the type to which my invention relates depends principally on the length of travel of the two mediums handled in the apparatus, namely, the gas and the liquid, and the resulting heating surface, it will be obvious that my apparatus is highly efficient, because the liquid flows in a long, tortuous path, in traveling through the appartus, and the gas or vapor is caused to bubble through the liquid numerous times, in traveling from the gas inlet to the gas outlet of the casing A.

Figure 5:
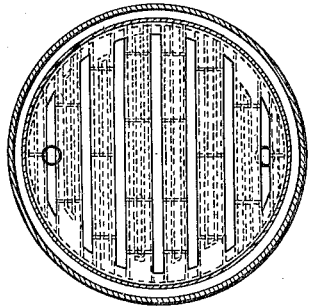
Figure 5 is a horizontal sectional view, on a reduced scale, taken on the line 5—5 of Figure 4.

In Figures 4 and 5 of the drawings I have illustrated my invention embodied in an apparatus that has the essential characteristics of the apparatus shown in Figures 1, 2 and 3, but which is of slightly different construction, the apparatus shown in Figures 4 and 5 being intended to be placed on the top of a tank that contains a volatile liquid for recovering the valuable constituents of the gases and vapors evolved in the tank by the evaporation of the liquid therein. Said apparatus comprises a casing A', which, if desired, may be provided with a water jacket, and a number of baffle structures B' arranged inside of said casing in superimposed relation and connected together in such a way that an absorbing liquid which is admitted to the top baffle structure B' through a supply pipe 1ª will circulate through the liquid troughs of same and thereafter flow through the succeeding baffle structures, finally escaping from the lowermost baffle structure through a discharge pipe 2ª arranged so that it will empty into the storage tank on which the apparatus is mounted. Each of the baffle structures B' comprises a number of liquid troughs 5ª of substantially channel shape in cross section arranged in spaced relation with gas passageways 9ª between same, and baffle elements 10ª of substantially inverted channel shape in cross section arranged over said gas passageways 9ª with their side flanges or depending skirt portions submerged partly in the liquid in the troughs 5ª. The liquid troughs 5ª of each baffle structure consist of straight troughs that are arranged in parallel relation and connected together in such a way that the liquid will circulate through all of the troughs of the baffle structure and then escape therefrom to the next lowermost baffle structure through an overflow 18ª. The vapors or gases that enter the lower end of the casing A' travel upwardly through said casing, thereby causing the valuable constituents of said gases or vapors to be absorbed by the liquid circulating through the troughs of the baffle structures B', the vapors finally escaping through an outlet 4ª at the upper end of the casing A', which, if desired, may be provided with a closure 4ᵇ that is normally maintained in its open position by a fusible link 4ᶜ that will break in the event of a fire in proximity to the apparatus, and thus permit the closure 4ᵇ to close automatically.

Having thus described my invention, what I claim as new and desire to secure by Letters Patent is:

1. An apparatus of the character described, comprising an upright casing through which gases circulate, a number of liquid holders arranged in said casing in superimposed relation and each comprising a number of connected trough portions that form a tortuous liquid passageway, said trough portions being separated from each other by openings through which the gases circulate longitudinally of the casing and said liquid holders being so arranged that the liquid supplied to the uppermost holder will pass successively through the other liquid holders in said casing, and means combined with each of said liquid holders and arranged over the gas passageways between the trough portions of same for causing the gases to bubble through the liquid in each holder in traveling longitudinally of the casing past the holder.

2. An apparatus of the character described, comprising a vertically-disposed casing through which gases circulate, a number of liquid holders arranged in said casing in superimposed relation and each composed of a number of connected trough portions of channel shape in cross section separated from each other by gas passageways through which the gases circulate longitudinally of the casing, said holders being so arranged that the liquid supplied to the uppermost holder will pass successively through the other liquid holders in said casing, and a baffling means combined with each of said holders and composed of substantially inverted, channel-shaped elements arranged over said gas passageways with their side flanges projecting downwardly into the trough portions of the liquid holders.

3. An apparatus of the character described, comprising a casing through which gases circulate, a number of liquid holders arranged in said casing in superimposed relation and each comprising an open trough composed of a number of convolutions connected together in such a way that liquid admitted to one end of said trough will circulate through the trough in a substantially spiral path, said convolutions being separated from each other by gas passageways through which the gases circulate longitudinally of the casing, and baffle elements arranged over the gas passageways between the convolutions of each trough for causing the gases to bubble through the liquid in the trough in traveling upwardly through the casing.

4. An apparatus of the character described, comprising a casing through which gases circulate, a number of liquid holders arranged in said casing in superimposed relation and each composed of a number of segmental trough members of substantially channel shape in cross section connected together so as to form an open trough composed of a number of convolutions, said convolutions being separated from each other by open spaces that form gas passageways up through which the gases circulate longitudinally of the casing, and a baffling means associated with each of said liquid holders and composed of segmental baffle elements of inverted channel shape in cross section arranged with their webs extending over said gas passageways and with their side flanges projecting downwardly into said trough members.

WALTER E. BROWN.